(12) United States Patent  
Fomenkov et al.

(10) Patent No.: US 9,029,813 B2  
(45) Date of Patent: May 12, 2015

(54) FILTER FOR MATERIAL SUPPLY APPARATUS OF AN EXTREME ULTRAVIOLET LIGHT SOURCE

(75) Inventors: Igor V. Fomenkov, San Diego, CA (US); William N. Partlo, Poway, CA (US); Georgiy O. Vaschenko, San Diego, CA (US); William Oldham, Orinda, CA (US)

(73) Assignee: ASML Netherlands B.V., Veldhoven (NL)

( * ) Notice: Subject to any disclaimer, the term of this patent is extended or adjusted under 35 U.S.C. 154(b) by 0 days.

(21) Appl. No.: 13/112,784

(22) Filed: May 20, 2011

(65) Prior Publication Data

US 2012/0292527 A1    Nov. 22, 2012

(51) Int. Cl.
*G01J 3/10* (2006.01)
*B22F 3/105* (2006.01)
*B01D 29/56* (2006.01)

(52) U.S. Cl.
CPC ............... *B22F 3/105* (2013.01); *B01D 29/56* (2013.01)

(58) Field of Classification Search
USPC ..................... 73/61.72; 250/504 R
See application file for complete search history.

(56) References Cited

U.S. PATENT DOCUMENTS

| 3,955,953 | A |  | 5/1976  | Hauser |  |
|---|---|---|---|---|---|
| 5,139,238 | A | * | 8/1992  | Buhr | 266/238 |
| 5,673,902 | A | * | 10/1997 | Aubrey et al. | 266/229 |
| 5,973,902 | A | * | 10/1999 | King | 361/111 |
| 6,331,351 | B1 |  | 12/2001 | Waters et al. |  |
| 6,428,709 | B1 | * | 8/2002  | Tsuihiji et al. | 210/739 |
| 6,491,872 | B1 | * | 12/2002 | Wick | 422/72 |
| 6,680,025 | B2 | * | 1/2004  | Hearst et al. | 422/22 |
| 6,835,944 | B2 |  | 12/2004 | Orsini et al. |  |
| 7,122,816 | B2 |  | 10/2006 | Algots et al. |  |
| 7,128,772 | B2 |  | 10/2006 | Brueck |  |
| 7,405,416 | B2 |  | 7/2008  | Algots et al. |  |
| 7,449,703 | B2 |  | 11/2008 | Bykanov |  |
| 7,465,946 | B2 | * | 12/2008 | Bowering et al. | 250/504 R |
| 7,872,245 | B2 |  | 1/2011  | Vaschenko et al. |  |
| 2005/0133613 | A1 | * | 6/2005 | Mayer et al. | 239/63 |
| 2005/0172896 | A1 |  | 8/2005 | Ohkawa |  |

(Continued)

FOREIGN PATENT DOCUMENTS

EP    1574901 A1    9/2005

OTHER PUBLICATIONS

Copper Nanoparticles Harm Zebrafish, Nanowerk News, Oct. 24, 2007, <http://www.nanowerk.com/news/newsid=3049.php>.*

(Continued)

*Primary Examiner* — Michael Logie
*Assistant Examiner* — Jason McCormack
(74) *Attorney, Agent, or Firm* — DiBerardino McGovern IP Group LLC

(57) ABSTRACT

A filter is used in a target material supply apparatus and includes a sheet having a first flat surface and a second opposing flat surface, and a plurality of through holes. The first flat surface is in fluid communication with a reservoir that holds a target mixture that includes a target material and non-target particles. The through holes extend from the second flat surface and are fluidly coupled at the second flat surface to an orifice of a nozzle. The sheet has a surface area that is exposed to the target mixture, the exposed surface area being at least a factor of one hundred less than an exposed surface area of a sintered filter having an equivalent transverse extent to that of the sheet.

42 Claims, 13 Drawing Sheets

(56) References Cited

U.S. PATENT DOCUMENTS

| | | | |
|---|---|---|---|
| 2006/0011870 A1* | 1/2006 | Yamamoto et al. | 250/504 R |
| 2006/0101794 A1 | 5/2006 | Gregoire et al. | |
| 2006/0192153 A1* | 8/2006 | Bykanov et al. | 250/503.1 |
| 2007/0125702 A1* | 6/2007 | Ramaswamy et al. | 210/490 |
| 2008/0057268 A1* | 3/2008 | Lu et al. | 428/116 |
| 2008/0087847 A1 | 4/2008 | Bykanov et al. | |
| 2008/0155963 A1* | 7/2008 | Iida | 60/273 |
| 2008/0156709 A1* | 7/2008 | Johnson | 210/106 |
| 2010/0096099 A1* | 4/2010 | Takashina et al. | 164/134 |
| 2010/0096342 A1* | 4/2010 | Roberts | 210/777 |
| 2010/0200776 A1* | 8/2010 | Yabu et al. | 250/504 R |
| 2011/0030507 A1* | 2/2011 | Aichinger et al. | 75/503 |
| 2011/0097215 A1* | 4/2011 | O'Shaughnessy et al. | 417/48 |
| 2011/0220574 A1* | 9/2011 | Bakajin et al. | 210/650 |
| 2011/0274601 A1* | 11/2011 | Boorse | 423/213.2 |

OTHER PUBLICATIONS

Glass Fiber Filters, Metalworld, Apr. 2008.*

Lee W. Young, International Search Report in counterpart application PCT/US12/29838, issued Jul. 16, 2012, 3 pages.

Lee W. Young, Written Opinion of the International Searching Authority in counterpart application PCT/US12/29838, issued Jul. 16, 2012, 6 pages.

First Office Action in counterpart Chinese Application No. 201280024335.6, issued on Dec. 15, 2014, 4 pages, with English translation as provided by Chinese patent counsel, 5 pages.

Communication pursuant to Rule 164(1) EPC and Supplementary Partial European Search Report under Rule 164, paragraph 1 of the European Patent Convention, mailed on Nov. 24, 2014 in European Patent Application No. 12790335.9 (counterpart to U.S. Appl. No. 13/112,784), 6 pages.

* cited by examiner

FILTER FOR MATERIAL SUPPLY APPARATUS OF AN EXTREME ULTRAVIOLET LIGHT SOURCE

TECHNICAL FIELD

The disclosed subject matter relates to a filter for use in a target material supply apparatus.

BACKGROUND

Extreme ultraviolet ("EUV") light, for example, electromagnetic radiation having wavelengths of around 50 nm or less (also sometimes referred to as soft x-rays), and including light at a wavelength of about 13 nm, can be used in photolithography processes to produce extremely small features in substrates, for example, silicon wafers.

Methods to produce EUV light include, but are not necessarily limited to, converting a material into a plasma state that has an element, for example, xenon, lithium, or tin, with an emission line in the EUV range. In one such method, often termed laser produced plasma ("LPP"), the required plasma can be produced by irradiating a target material, for example, in the form of a droplet, stream, or cluster of material, with an amplified light beam that can be referred to as a drive laser. For this process, the plasma is typically produced in a sealed vessel, for example, a vacuum chamber, and monitored using various types of metrology equipment.

SUMMARY

In some general aspects, an apparatus supplies a target material to a target location. The apparatus includes a reservoir that holds a target mixture that includes the target material and non-target particles; a first filter through which the target mixture is passed; a second filter through which the target mixture is passed; and a supply system that receives the target mixture that has passed through the first and second filters and that supplies the target mixture to the target location. The second filter includes a set of through holes having uniformly-sized cross-sectional widths and has a surface area that is exposed to the target mixture, the exposed surface area being at least a factor of one hundred less than an exposed surface area of a sintered filter having an equivalent transverse extent to that of the second filter.

Implementations can include one or more of the following features. For example, the second filter can receive the target mixture that has passed through the first filter. Or, the first filter can receive the target mixture that has passed through the second filter.

The second filter can include another set of uniformly-sized through holes having a transverse size that is different from a transverse size of the uniformly-sized through holes of the set.

The first filter can be selected from the group of sintered filters and mesh filters.

The first filter can also include a set of through holes having uniformly-sized cross-sectional widths and can have a surface area that is exposed to the target mixture, the exposed surface area being at least a factor of one hundred less than an exposed surface area of a sintered filter having an equivalent transverse extent to that of the second filter. The cross-sectional widths of the through holes of the first filter set can be different from the cross-sectional widths of the through holes of the second filter set.

The second filter can have a thickness along a longitudinal direction that is large enough to withstand a pressure differential across the second filter.

Each hole in the set of through holes of the second filter can have a cross-sectional width that is less than 10 μm. The cross-sectional width of each hole in the set of through holes of the second filter can vary no more than 20% from the cross-sectional width of each of the other holes in the set of through holes of the second filter.

The supply system can include a nozzle that defines an orifice through which the target mixture is passed. The nozzle can direct the target mixture toward the target location through the orifice. The cross-sectional width of each hole in the set of through holes of the second filter can be less than a cross-sectional width of the nozzle orifice. The supply system can be configured to generate droplets of the target material.

At least one of the first and second filters can be made at least in part of tungsten, titanium, molybdenum, nickel, tantalum, or other metal, quartz, glass, or ceramic material.

The through holes of the set in the second filter can be sized to block at least some of the non-target particles.

The target mixture can be a fluid. The fluid can be a liquid, a gas, or, to some extent, a plastic solid.

The second filter can be made of glass or tungsten. The second filter can be a non-mesh and a non-sintered filter.

The second filter can include etched holes or collimated capillary holes. The first filter can be a sintered filter. The second filter can include micro-machined holes.

The first filter can include holes that are sized to block at least some of the non-target particles. The second filter can include holes that are sized to block at least some of the non-target particles.

The second filter can be made of a material that is different from a material of the first filter. The second filter can be made of glass.

The target material can be pure tin. In this case, the first filter can be made of a material that is not perfectly compatible with tin, for example, the material of the first filter may be readily corroded or eroded by liquid tin. For example, the first filter can be made of titanium, stainless steel, or a material that is formable, sinterable, ductile enough to withstand mounting after sintering. In this case, the second filter is more compatible with tin. For example, the second filter can be made of glass, tungsten, nickel, other refractory metal, quartz, or a suitable ceramic material (such as alumina, silicon carbide, silicon nitride, TiN, etc.).

In other general aspects, an apparatus includes a reservoir that holds a target mixture that includes a target material and non-target particles; a first filter through which the target mixture is passed, the first filter being made of a first material; a second filter through which the target mixture is passed, the second filter being made of a second material that is different from the first material; a supply system that receives the target mixture that has passed through the first and second filters and that supplies the target mixture to the target location; a radiation source that supplies radiation to the target location to thereby strike the target mixture; and a collection system that captures and directs extreme ultraviolet light generated by the target mixture struck by the radiation.

Implementations can include one or more of the following features. For example, the second filter can receive the target mixture that has passed through the first filter.

The target material can include tin and the second material can include glass or tungsten.

The second filter can include a set of through holes having uniformly-sized cross-sectional widths.

In another general aspect, a filter that is used in a target material supply apparatus includes a plurality of through holes that are fluidly coupled at a first end to a reservoir that holds a target mixture that includes a target material and non-target particles, and are fluidly coupled at a second end to an orifice of a nozzle. A cross-sectional width of each through hole of the plurality of through holes of the filter varies no more than 20% from the cross-sectional width of each of the other through holes of the plurality of through holes and the cross-sectional width of each hole of the plurality of through holes is less than a height of the hole.

Implementations can include one or more of the following features. For example, the through holes can be cylindrically-shaped. The number and the cross-sectional width of the holes of the plurality can be chosen so that a pressure drop across the filter is negligible after the target mixture fills a volume between the filter and the nozzle and the target mixture flows through the nozzle orifice. The cross-sectional widths of the holes can be sized to block at least some of the non-target particles.

The filter can be made of a material that is compatible with the target material. The filter can be made of tungsten or glass or other ceramic if the target material includes tin.

Each of the holes can have a circular cross section and the cross-sectional width of the hole can be a diameter of its circular cross section.

The filter can also include a plurality of openings, each opening being between the first end of the reservoir and a set of holes such that the opening fluidly couples the first end of the reservoir to the set of holes. Each opening can have a cross-sectional width; and each hole in the set of holes can have a cross-sectional width that is smaller than the cross-sectional width of the opening to which the hole is fluidly coupled. Each of the openings can have a circular cross section and the cross-sectional width of the opening is a diameter of its circular cross section. The cross-sectional widths of the holes can be sized to block at least some of the non-target particles.

In another general aspect, a filter for use in a target material supply apparatus includes a plurality of through holes that are fluidly coupled at a first end to a reservoir that holds a target mixture that includes a target material and non-target particles, and are fluidly coupled at a second end to an orifice of a nozzle; and a plurality of openings, each opening being between the first end of the reservoir and a group of through holes such that the opening fluidly couples the first end of the reservoir to the group of through holes. Each opening has a cross-sectional width, and each through hole in the group of through holes has a cross-sectional width that is smaller than the cross-sectional width of the opening to which the through hole is fluidly coupled.

Implementations can include one or more of the following features. For example, the through holes can be cylindrical and have a uniform cross-sectional width along an axial length of the through hole. The through holes can be formed as a capillary array.

The plurality of openings can be defined between a first surface that faces the reservoir and the set of through holes. The plurality of through holes can be defined between a second surface that faces the nozzle and the plurality of openings.

In other general aspects, a device for generating light includes a radiation source that supplies radiation to a target location; a supply system that supplies a target mixture to the target location such that a plasma is formed when a target material within the target mixture is irradiated by the supplied radiation; and a filter configured to remove at least some non-target particles from the target mixture before the target mixture reaches the target location. The filter includes a plurality of through holes that are fluidly coupled at a first end to a reservoir that holds the target mixture that includes the target material and the non-target particles, and are fluidly coupled at a second end to the supply system; and a plurality of openings, each opening being between the first end of the reservoir and a group of through holes such that the opening fluidly couples the first end of the reservoir to the group of through holes.

Implementations can include one or more of the following features. For example, each opening can have a cross-sectional width, and each through hole in the group of through holes can have a cross-sectional width that is smaller than the cross-sectional width of the opening to which the through hole is fluidly coupled.

In another general aspect, a filter for use in a target material supply apparatus includes a sheet having a first flat surface and a second opposing flat surface, the first flat surface being in fluid communication with a reservoir that holds a target mixture that includes a target material and non-target particles; and a plurality of through holes extending from the second flat surface and being fluidly coupled at the second flat surface to an orifice of a nozzle. The sheet has a surface area that is exposed to the target mixture, the exposed surface area being at least a factor of one hundred less than an exposed surface area of a sintered filter having an equivalent transverse extent to that of the sheet.

Implementations can include one or more of the following features. For example, the exposed surface area can be at least a factor of ten thousand less than an exposed surface area of a sintered filter having an equivalent transverse extent to that of the sheet. The filter can also include a plurality of openings extending from the first flat surface, each opening fluidly coupling a group of through holes to the reservoir.

In other general aspects, a method of filtering includes holding a target mixture that includes a target material and non-target particles in a reservoir; removing, using a first filter, at least some of the non-target particles of the target mixture; removing, using a second filter that has a set of through holes having uniformly-sized cross-sectional widths, at least some of the non-target particles of the target mixture; controlling, using a supply system, a flow of the target mixture that passed through the second filter; and directing the target mixture passed through the second filter to a target location that receives an amplified light beam to thereby convert the target material of the target mixture into a plasma state.

Implementations can include one or more of the following features. For example, removing at least some of the non-target particles of the target mixture using the second filter can include removing at least some of the non-target particles of the target mixture that remain after having passed through the first filter.

The method can also include removing, using the second filter, at least some non-target particles of the target mixture that were introduced into the target mixture by the first filter.

The target mixture flow can be controlled by passing the target mixture from the second filter through an orifice of the supply system.

DRAWING DESCRIPTION

Figure 2:
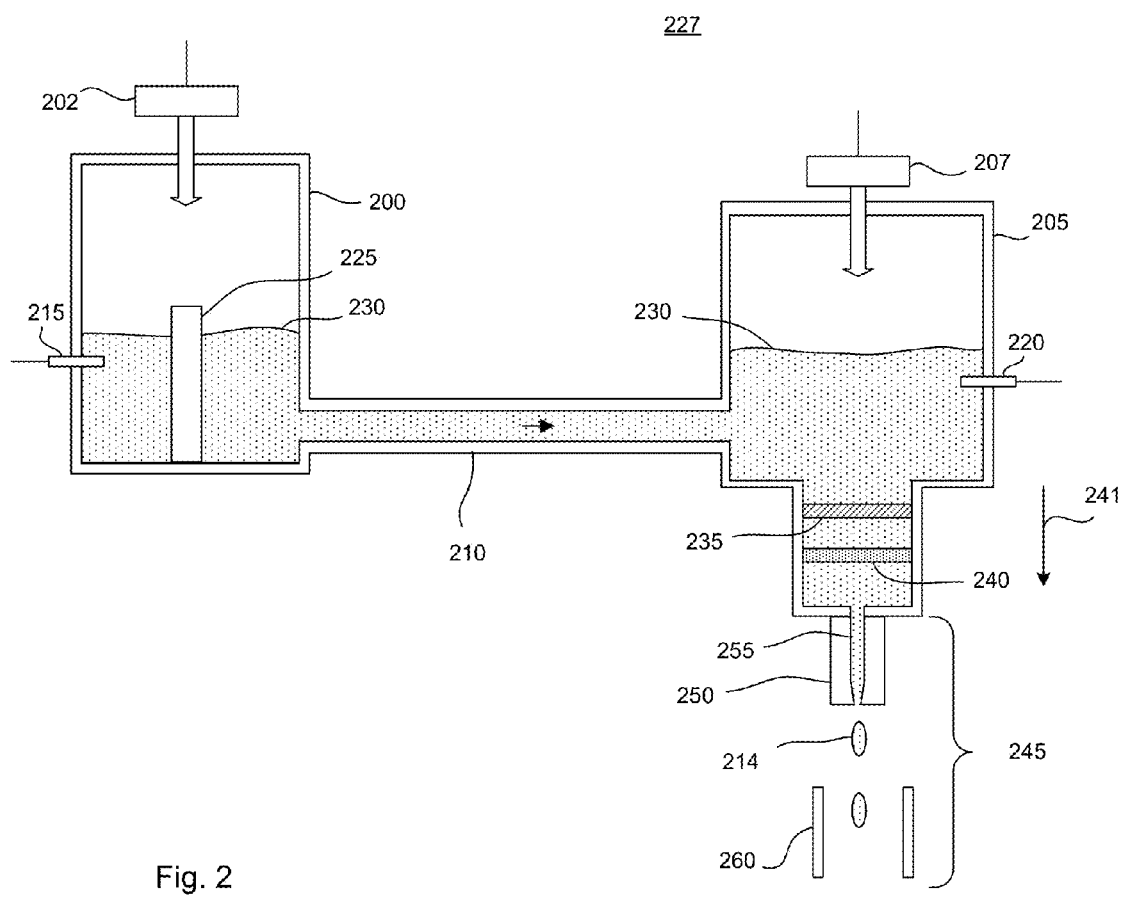
FIGS. 2-4 are schematic cross-sectional diagrams of exemplary target material supply apparatuses of the light source of FIG. 1.
Figure 3:
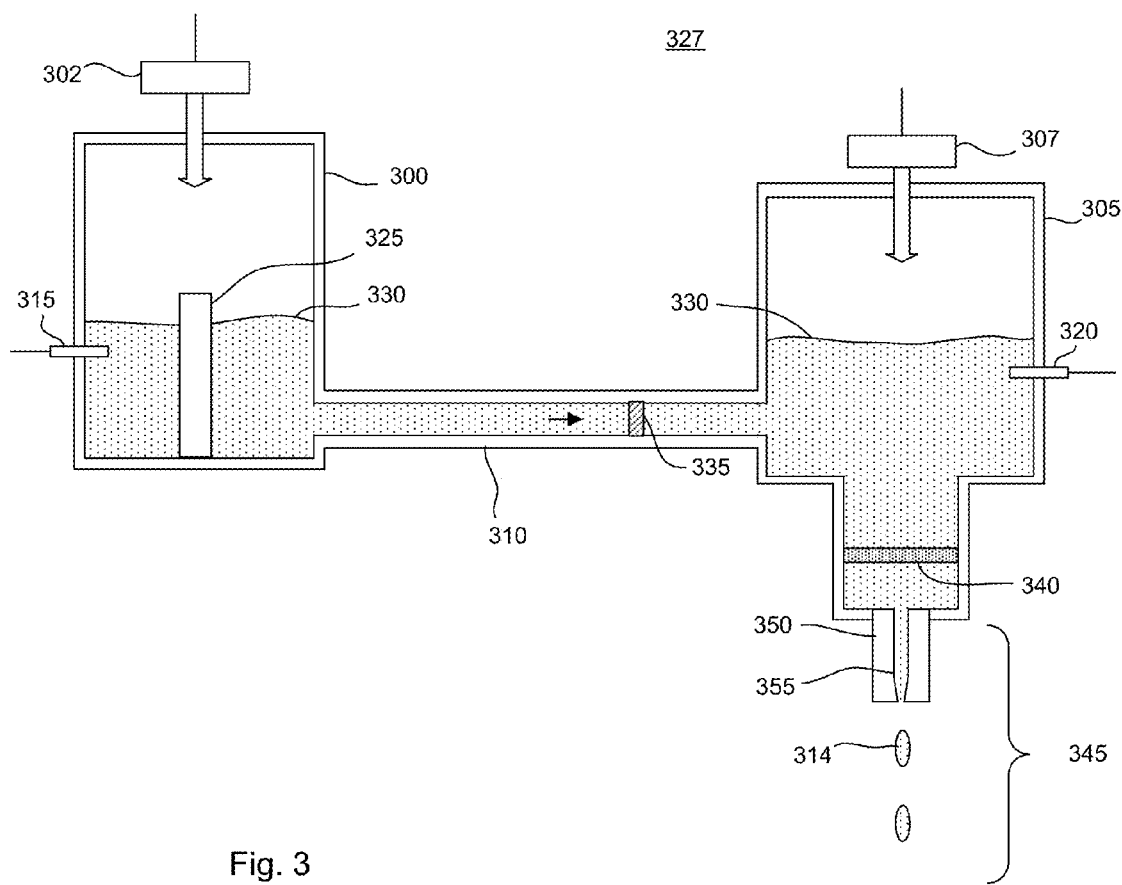
Figure 4:
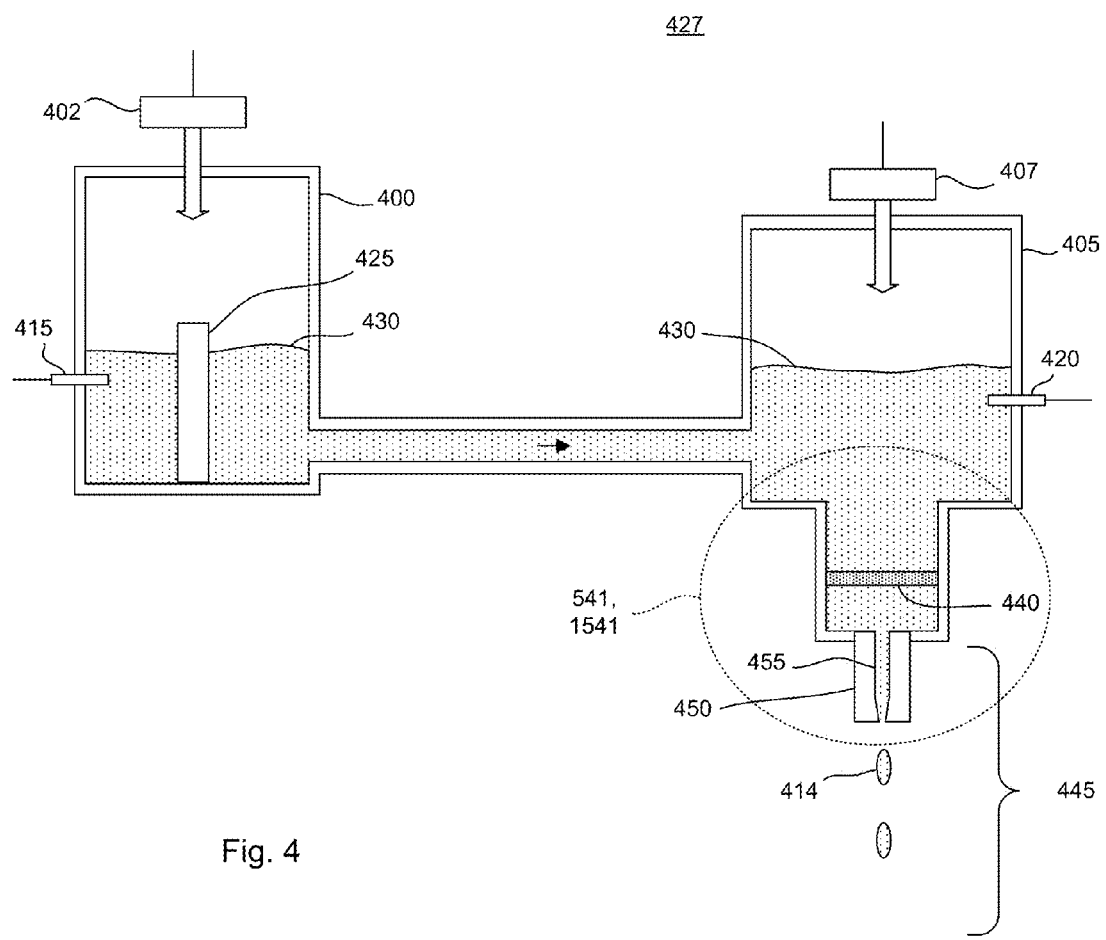
Figure 6A:
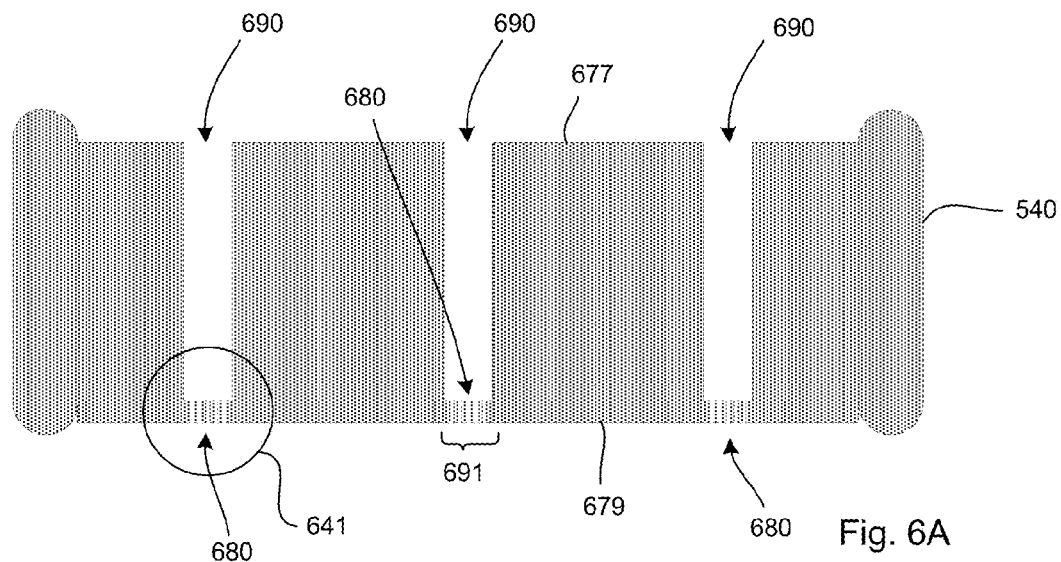
FIG. 6A is a schematic cross-sectional diagram showing an exemplary filter that can be used in the design of FIG. 5.
Figure 6B:
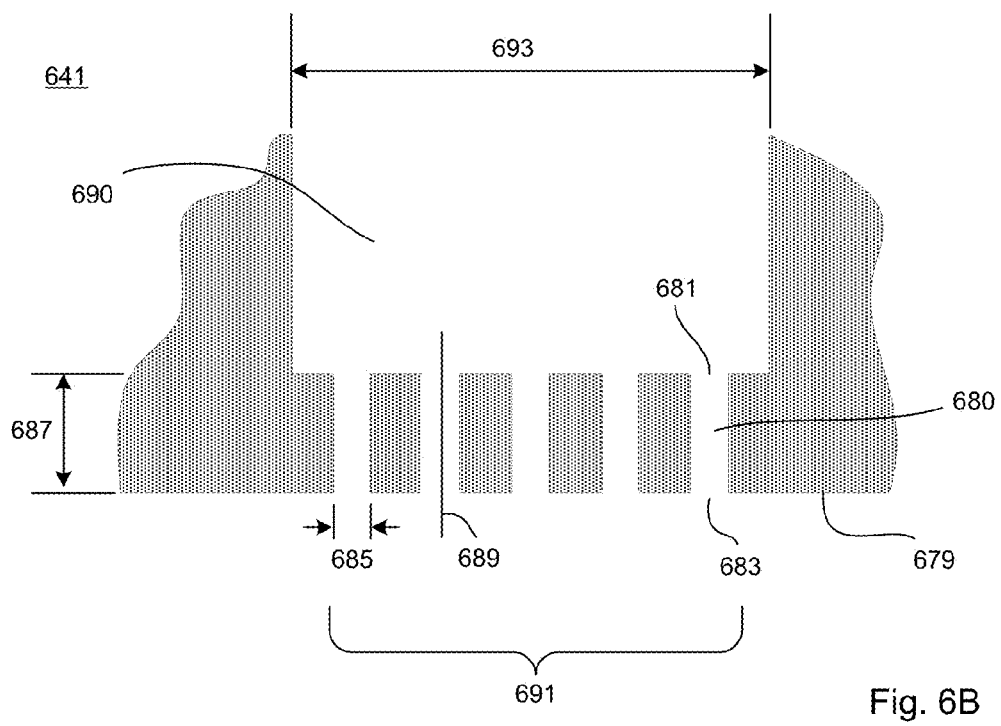
FIG. 6B is a schematic cross-sectional diagram of a magnified portion of the filter of FIG. 6A that shows details of holes formed therein.
Figure 7:
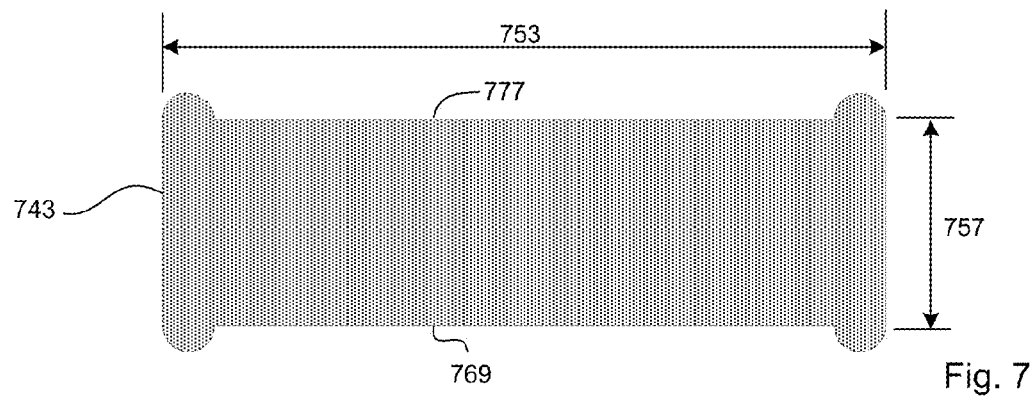
FIG. 7 is a schematic cross-sectional diagram of a bulk substance that is used to form the filter in FIGS. 6A and 6B.
Figure 13A:
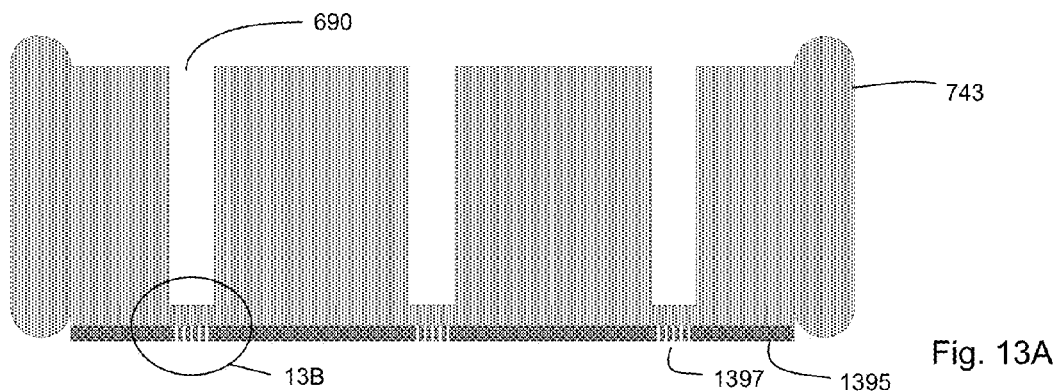
Figure 13B:
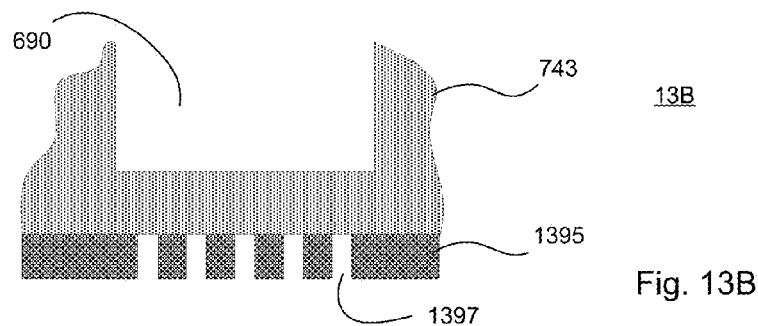
Figure 14A:
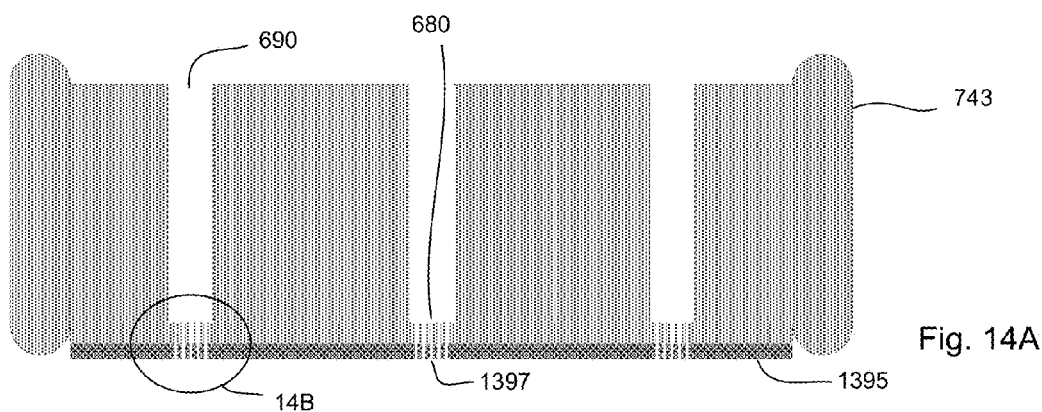
Figure 14B:
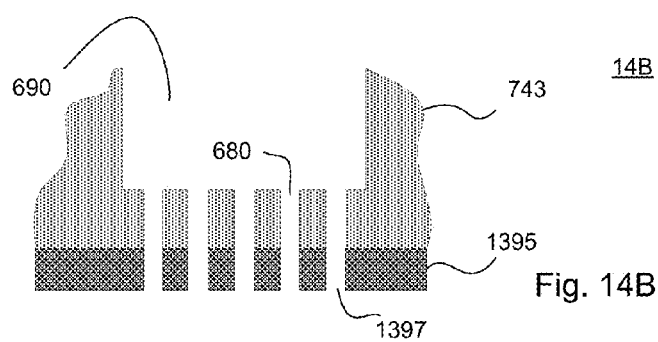
Figure 15:
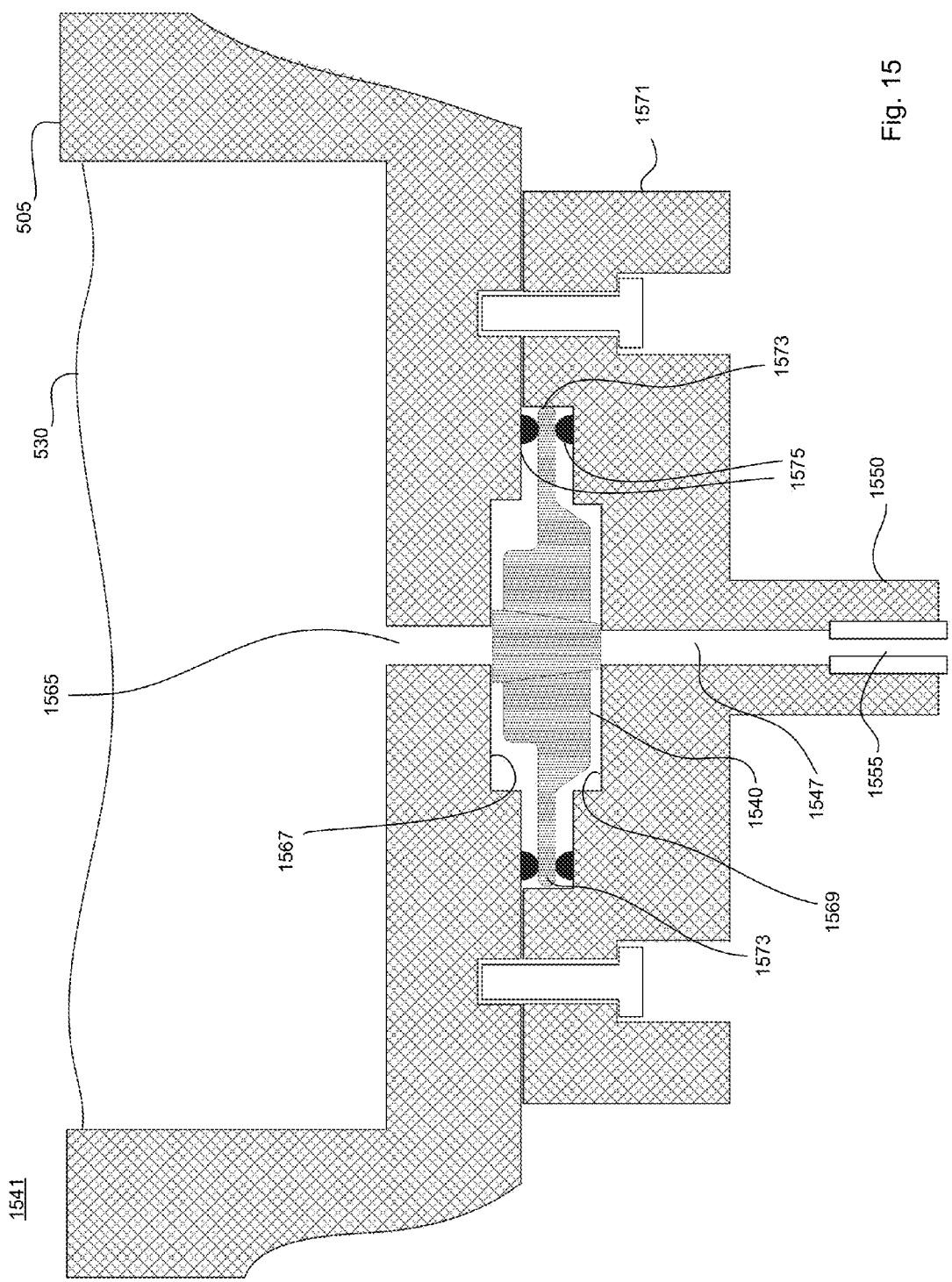
Figure 16:
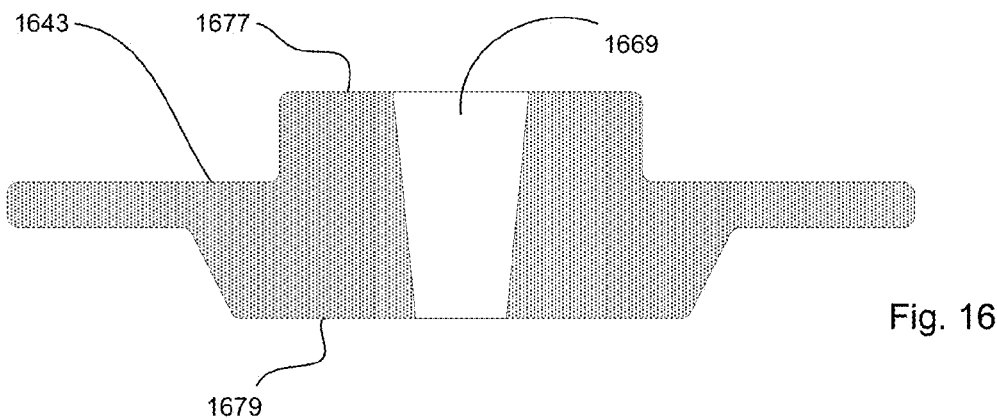
Figure 17:
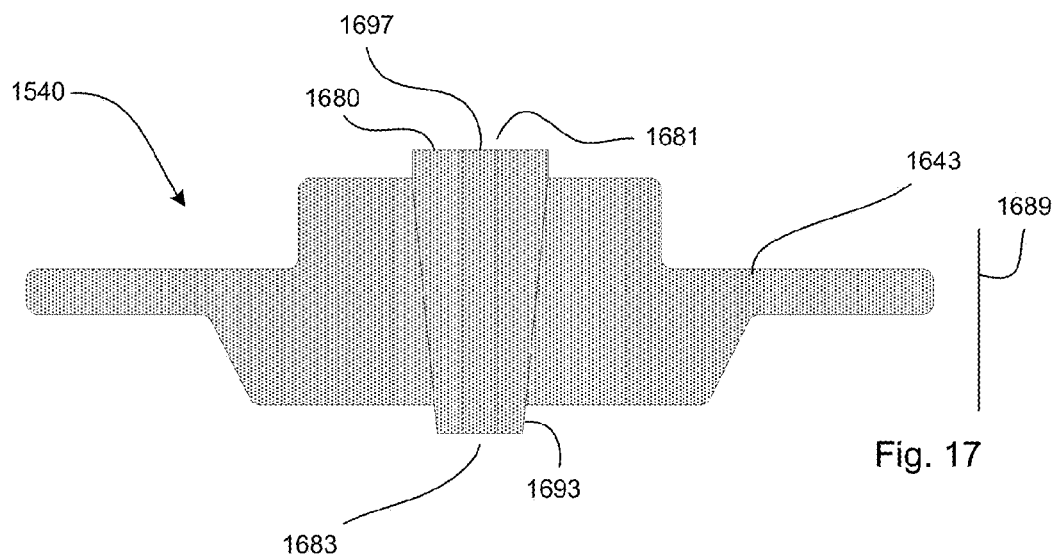
Figure 18A:
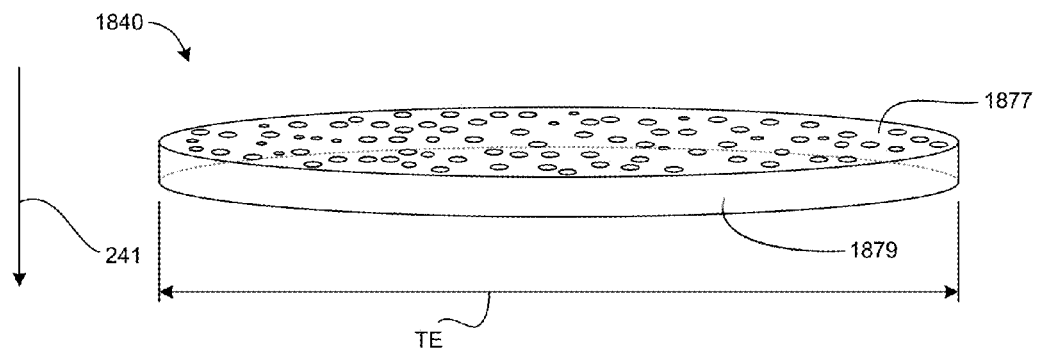
Figure 18B:
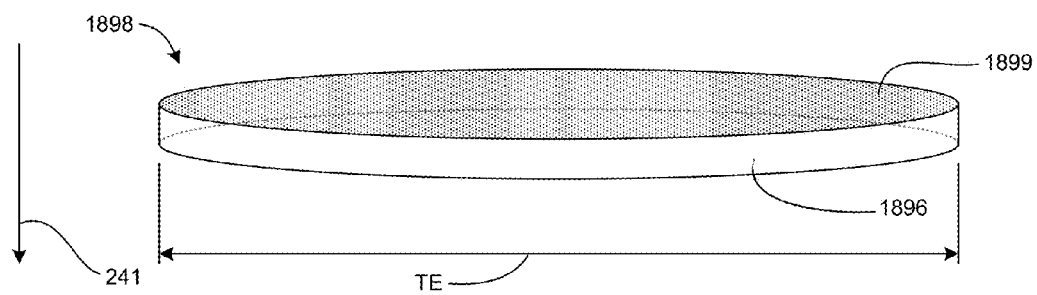

FIGS. 9-12, 13A, and 14A are cross-sectional views showing each step in the process of forming the filter of FIGS. 6A and 6B from the bulk substance of FIG. 7;

FIG. 13B is a schematic cross-sectional diagram of a magnified portion of the bulk substance of FIG. 13A;

FIG. 14B is a schematic cross-sectional diagram of a magnified portion of the bulk substance of FIG. 14A;

FIG. 15 is a schematic cross-sectional diagram showing an exemplary filter design within the target material supply apparatuses of FIGS. 2-4;

FIG. 16 is a schematic cross-sectional diagram of a bulk substance that is used to form the filter in FIG. 15;

FIG. 17 is a schematic cross-sectional diagram of the filter in FIG. 15;

FIG. 18A is a perspective view of an exemplary non-mesh, non-sintered filter that can be used in the target material supply apparatuses of FIGS. 2-4; and FIG. 18B is a perspective view of an exemplary sintered filter having the same transverse extent of the exemplary filter of FIG. 18A.

DESCRIPTION

Figure 1:
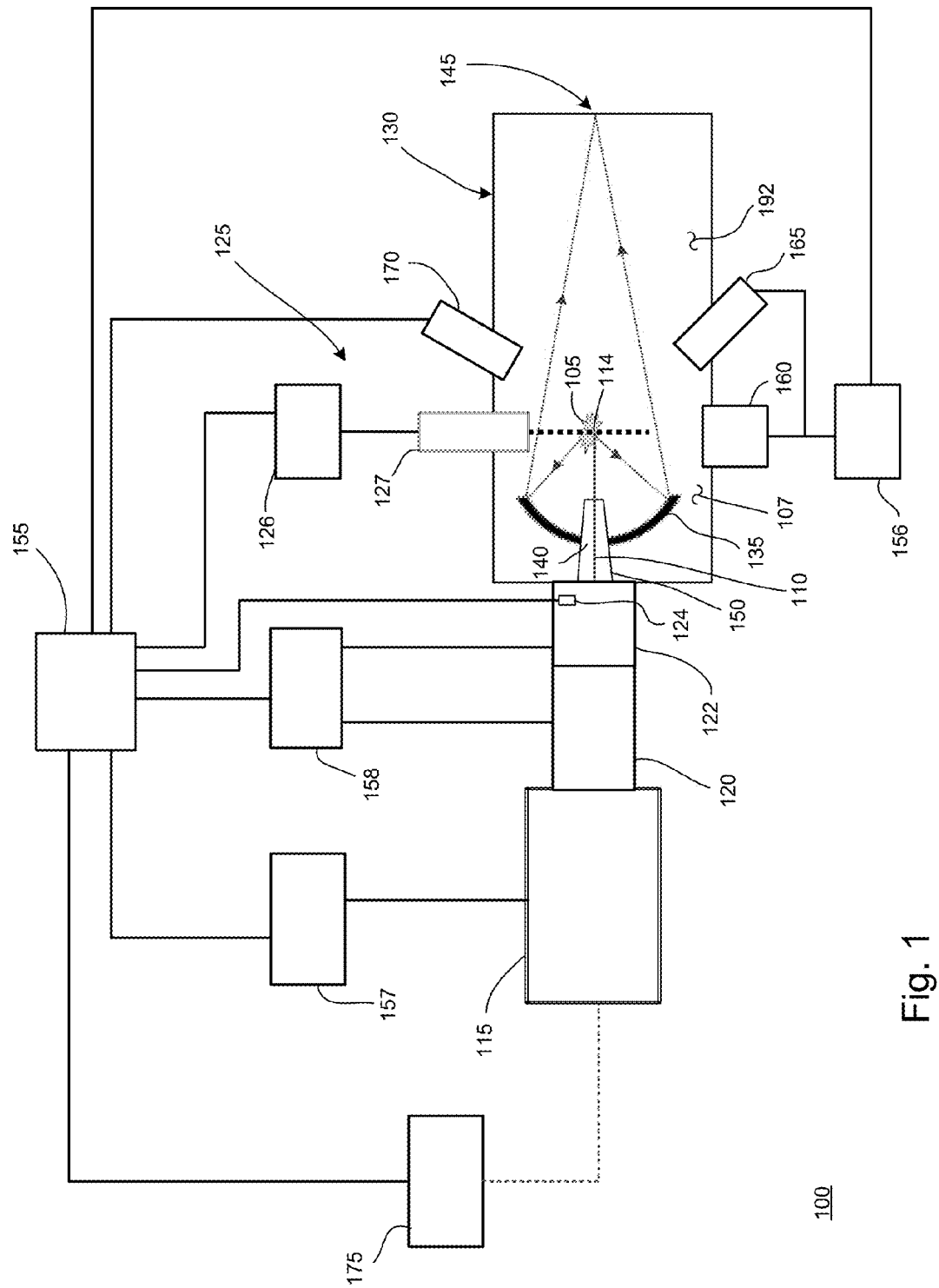
FIG. 1 is a block diagram of a laser produced plasma (LPP) extreme ultraviolet (EUV) light source.

Referring to FIG. 1, an LPP EUV light source 100 is formed by irradiating a target mixture 114 at a target location 105 with an amplified light beam 110 that travels along a beam path toward the target mixture 114. The target location 105, which is also referred to as the irradiation site, is within an interior 107 of a vacuum chamber 130. When the amplified light beam 110 strikes the target mixture 114, a target material within the target mixture 114 is converted into a plasma state that has an element with an emission line in the EUV range. The created plasma has certain characteristics that depend on the composition of the target material within the target mixture 114. These characteristics can include the wavelength of the EUV light produced by the plasma and the type and amount of debris released from the plasma.

The light source 100 also includes a target material delivery system 125 that delivers, controls, and directs the target mixture 114 in the form of liquid droplets, a liquid stream, solid particles or clusters, solid particles contained within liquid droplets or solid particles contained within a liquid stream. The target mixture 114 includes the target material such as, for example, water, tin, lithium, xenon, or any material that, when converted to a plasma state, has an emission line in the EUV range. For example, the element tin can be used as pure tin (Sn); as a tin compound, for example, $SnBr_4$, $SnBr_2$, $SnH_4$; as a tin alloy, for example, tin-gallium alloys, tin-indium alloys, tin-indium-gallium alloys, or any combination of these alloys. The target mixture 114 can also include impurities such as non-target particles. Thus, in the situation in which there are no impurities, the target mixture 114 is made up of only the target material. The target mixture 114 is delivered by the target material delivery system 125 into the interior 107 of the chamber 130 and to the target location 105.

This description relates to the use of a filter and a method of filtering within the target material delivery system 125 for removing the impurities (such as non-target particles) within the target mixture 114. A description of the components of the light source 100 will initially be described as background before a detailed description of the target material delivery system 125.

The light source 100 includes a drive laser system 115 that produces the amplified light beam 110 due to a population inversion within the gain medium or mediums of the laser system 115. The light source 100 includes a beam delivery system between the laser system 115 and the target location 105, the beam delivery system including a beam transport system 120 and a focus assembly 122. The beam transport system 120 receives the amplified light beam 110 from the laser system 115, and steers and modifies the amplified light beam 110 as needed and outputs the amplified light beam 110 to the focus assembly 122. The focus assembly 122 receives the amplified light beam 110 and focuses the beam 110 to the target location 105.

In some implementations, the laser system 115 can include one or more optical amplifiers, lasers, and/or lamps for providing one or more main pulses and, in some cases, one or more pre-pulses. Each optical amplifier includes a gain medium capable of optically amplifying the desired wavelength at a high gain, an excitation source, and internal optics. The optical amplifier may or may not have laser mirrors or other feedback devices that form a laser cavity. Thus, the laser system 115 produces an amplified light beam 110 due to the population inversion in the gain media of the laser amplifiers even if there is no laser cavity. Moreover, the laser system 115 can produce an amplified light beam 110 that is a coherent laser beam if there is a laser cavity to provide enough feedback to the laser system 115. The term "amplified light beam" encompasses one or more of: light from the laser system 115 that is merely amplified but not necessarily a coherent laser oscillation and light from the laser system 115 that is amplified and is also a coherent laser oscillation.

The optical amplifiers in the laser system 115 can include as a gain medium a filling gas that includes $CO_2$ and can amplify light at a wavelength of between about 9100 and about 11000 nm, and in particular, at about 10600 nm, at a gain greater than or equal to 1000. Suitable amplifiers and lasers for use in the laser system 115 can include a pulsed laser device, for example, a pulsed, gas-discharge $CO_2$ laser device producing radiation at about 9300 nm or about 10600 nm, for example, with DC or RF excitation, operating at relatively high power, for example, 10 kW or higher and high pulse repetition rate, for example, 50 kHz or more. The optical amplifiers in the laser system 115 can also include a cooling system such as water that can be used when operating the laser system 115 at higher powers.

The light source 100 includes a collector mirror 135 having an aperture 140 to allow the amplified light beam 110 to pass through and reach the target location 105. The collector mirror 135 can be, for example, an ellipsoidal mirror that has a primary focus at the target location 105 and a secondary focus at an intermediate location 145 (also called an intermediate focus) where the EUV light can be output from the light source 100 and can be input to, for example, an integrated circuit lithography tool (not shown). The light source 100 can also include an open-ended, hollow conical shroud 150 (for example, a gas cone) that tapers toward the target location 105 from the collector mirror 135 to reduce the amount of plasma-generated debris that enters the focus assembly 122 and/or the beam transport system 120 while allowing the amplified light beam 110 to reach the target location 105. For this purpose, a gas flow can be provided in the shroud that is directed toward the target location 105.

The light source 100 can also include a master controller 155 that is connected to a droplet position detection feedback system 156, a laser control system 157, and a beam control system 158. The light source 100 can include one or more target or droplet imagers 160 that provide an output indicative of the position of a droplet, for example, relative to the target location 105 and provide this output to the droplet position detection feedback system 156, which can, for example, compute a droplet position and trajectory from which a droplet position error can be computed either on a droplet by droplet basis or on average. The droplet position detection feedback system 156 thus provides the droplet position error as an input to the master controller 155. The master controller 155 can therefore provide a laser position, direction, and timing correction signal, for example, to the laser control system 157 that can be used, for example, to control the laser timing circuit and/or to the beam control system 158 to control an amplified light beam position and shaping of the beam transport system 120 to change the location and/or focal power of the beam focal spot within the chamber 130.

The target material delivery system 125 includes a target material delivery control system 126 that is operable in response to a signal from the master controller 155, for example, to modify the release point of the droplets as released by a target material supply apparatus 127 to correct for errors in the droplets arriving at the desired target location 105.

Additionally, the light source 100 can include a light source detector 165 that measures one or more EUV light parameters, including but not limited to, pulse energy, energy distribution as a function of wavelength, energy within a particular band of wavelengths, energy outside of a particular band of wavelengths, and angular distribution of EUV intensity and/or average power. The light source detector 165 generates a feedback signal for use by the master controller 155. The feedback signal can be, for example, indicative of the errors in parameters such as the timing and focus of the laser pulses to properly intercept the droplets in the right place and time for effective and efficient EUV light production.

The light source 100 can also include a guide laser 175 that can be used to align various sections of the light source 100 or to assist in steering the amplified light beam 110 to the target location 105. In connection with the guide laser 175, the light source 100 includes a metrology system 124 that is placed within the focus assembly 122 to sample a portion of light from the guide laser 175 and the amplified light beam 110. In other implementations, the metrology system 124 is placed within the beam transport system 120. The metrology system 124 can include an optical element that samples or re-directs a subset of the light, such optical element being made out of any material that can withstand the powers of the guide laser beam and the amplified light beam 110. A beam analysis system is formed from the metrology system 124 and the master controller 155 since the master controller 155 analyzes the sampled light from the guide laser 175 and uses this information to adjust components within the focus assembly 122 through the beam control system 158.

Thus, in summary, the light source 100 produces an amplified light beam 110 that is directed along the beam path to irradiate the target mixture 114 at the target location 105 to convert the target material within the mixture 114 into plasma that emits light in the EUV range. The amplified light beam 110 operates at a particular wavelength (that is also referred to as a source wavelength) that is determined based on the design and properties of the laser system 115. Additionally, the amplified light beam 110 can be a laser beam when the target material provides enough feedback back into the laser system 115 to produce coherent laser light or if the drive laser system 115 includes suitable optical feedback to form a laser cavity.

Referring to FIG. 2, in an exemplary implementation, a target material supply apparatus 227 includes two chambers, a first chamber 200 (which is also referred to as a bulk material chamber) and a second chamber 205 (which is also referred to as a reservoir) fluidly coupled to the first chamber 200 by a pipe 210 that can be fitted with a valve to control the flow of material between the first chamber 200 and the second chamber 205. The first and second chambers 200, 205 may be hermetically sealed volumes with independent, active pressure controllers 202, 207. The first and second chambers 200, 205, and the pipe 210 can be thermally coupled to one or more heaters that control the temperature of the first and second chambers 200, 205 and the pipe 210. Additionally, the apparatus 227 can also include one or more level sensors 215, 220 that detect an amount of substance within each of the respective chambers 200, 205. The output of the level sensors 215, 220 can be fed to the control system 126, which is also connected to the pressure controllers 202, 207.

In operation, an operator fills the first chamber 200 with a bulk substance 225, and heats up the substance 225 using the heater thermally coupled to the first chamber 200 until the bulk substance 225 becomes a fluid, which can be a liquid, a gas, or a plasma. The resultant fluid can be referred to as a target mixture 230 that includes the target material plus other non-target particles. The non-target particles are impurities in the target mixture 230 that are removed by one or more filters (such as first and second filters 235, 240) in the apparatus 227. The pipe 210 and the second chamber 205 may also be heated by their respective heaters to maintain the target mixture 230 as a fluid.

The apparatus 227 also includes a supply system 245 at the output of the second chamber 205, following the second filter 240. The supply system 245 receives the target mixture 230 that has passed through the first and second filters 235, 240 and supplies the target mixture in the form of droplets 214 to the target location 105. To this end, the supply system 245 can include a nozzle 250 defining an orifice 255 through which the target mixture 230 escapes to form the droplets 214 of the target mixture. The output of the droplets 214 can be controlled by an actuator such as a piezoelectric actuator. Additionally, the supply system 245 can include other regulating or directing components 260 downstream of the nozzle 250. The nozzle 250 and/or the directing components 260 direct the droplets 214 (which is the target mixture 230 that has been filtered to include the target material and a lot less of the impurities) to the target location 105.

The control system 126 receives inputs from the level sensors 215, 220, and controls the heaters to melt a given amount of the substance 225. The control system 126 also controls the pressure in each of the chambers 200, 205 and the opening and closing of the valve in the pipe 210. A description of an exemplary arrangement of the first and second chambers 200, 205 is found in U.S. Pat. No. 7,122,816, which is incorporated herein by reference in its entirety.

As mentioned above, the apparatus 227 includes first and second filters 235, 240 through which the target mixture 230 is passed to remove impurities such as the non-target particles from the target mixture 230. The first filter 235, which is optional, can be a sintered filter or a mesh filter. The second filter 240 can be a filter that is a non-sintered, non-mesh filter that includes at least a set of uniformly-sized through holes formed between opposing flat surfaces, as described in greater detail below. The second filter 240 has a surface that is exposed to the target mixture 230, the exposed surface area of second filter 240 can be at least a factor of one hundred less than an exposed surface area of a sintered filter that has an equivalent transverse extent as the transverse extent of the second filter 240, as described in greater detail when discussing FIGS. 18A and 18B. In some implementations, the first filter 235 is also a non-sintered, non-mesh filter that also includes a set of uniformly-sized through holes formed between opposing flat surfaces.

The first filter 235 can be made from a first material and the second filter 240 can be made of a second material that is distinct from the first material. In this way, if the first material does not adequately remove the non-target particles from the target mixture 230 or if target material causes the first material to leach from the first filter into the target mixture 230, then the second material can be selected to be distinct from the first material to provide for the benefits not adequately provided for by the first material. Thus, the second material can be selected to remove the leached first material from the target mixture 230 or to more adequately remove other non-target particles from the target mixture 230. For example, if the first material is titanium, then the second material can be tungsten or glass.

Moreover, the holes of the second filter 240 can have a cross-sectional width that is different from a cross-sectional width of the holes of the first filter 235. Thus, in one implementation, the holes of the second filter 240 have a cross-sectional width that is less than the cross-sectional width of the holes of the first filter 235. In this way, the second filter 240 would be designed to remove smaller non-target particles in the target mixture 230. In other implementations, the holes of the second filter 240 have a cross-sectional width that is equal to or greater than a cross-sectional width of the holes of the first filter 235. In this way, the second filter 240 can be designed to remove non-target particles that were introduced into the target mixture 230 by the first filter 235.

Each hole of set of uniformly-sized through holes the second filter 240 can have a cross-sectional width that is less than 10 µm in the implementation in which the target material is tin. The cross-sectional width of each of the through holes in the set of the second filter 240 can be configured to vary no more than 20% from the cross-sectional width of each of the other holes in the set of the second filter 240; in this way, the second filter 240 can be said to have a set of "uniformly-sized" holes. Additionally, the cross-sectional width of each of the holes of the second filter 240 is less than the cross-sectional width of the orifice 255.

The width of a through hole is a distance that is measured along a cross section that is in the transverse plane, which is the plane that is perpendicular to a longitudinal direction 241, which is labeled in FIG. 2. The longitudinal direction 241 generally extends along the direction traveled by the target mixture 230 as it travels from the second chamber 205 toward the nozzle 250.

Referring to FIG. 3, another exemplary target material supply apparatus 327 is designed similarly to the apparatus 227 in that it includes a first chamber 300 and a second chamber 305 fluidly coupled to the first chamber 300 by a pipe 310. What distinguishes the apparatus 327 from the apparatus 227 is that the apparatus 327 includes a first filter 335 that is placed between the first chamber 300 and the second chamber 305 while the first filter 235 of the apparatus 227 is between the second chamber 205 and the supply system 245.

Referring to FIG. 4, another exemplary target material supply apparatus 427 is designed similarly to the apparatus 227 in that it includes a first chamber 400 and a second chamber 405 fluidly coupled to the first chamber 400 by a pipe 410. What distinguishes the apparatus 427 from the apparatus 227 is that the apparatus 427 lacks a first filter and includes only a filter 440 that is placed between the second chamber 405 and the supply system 445.

Figure 5:
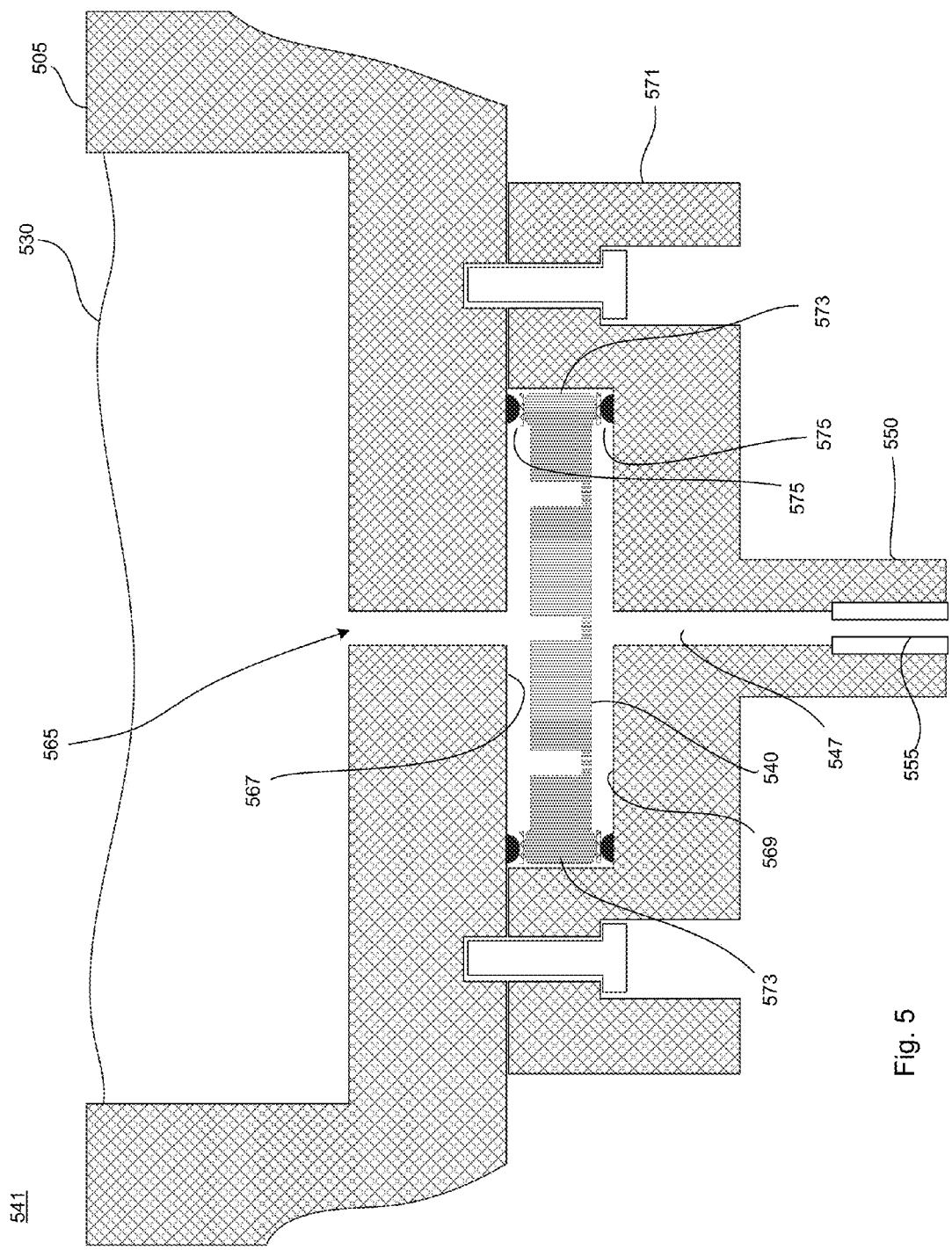
FIG. 5 is a schematic cross-sectional diagram showing an exemplary filter design within the target material supply apparatuses of FIGS. 2-4.

A description of an exemplary filter, which can be the second filter 240, 340 of FIGS. 2 and 3, or the filter 440 of FIG. 4, or can be both filters 235, 240 and 335, 340 of FIGS. 2 and 3, is provided next with reference to FIGS. 5-14B along with a description of how the filter is secured within the target material supply apparatus. Referring first to FIG. 5, the filter 540 is arranged near an opening 565 of the second chamber 505. The filter 540 is mounted between an outer face 567 of the second chamber 505 and a face 569 of a holder 571 that houses the supply system 545. The mount is such that the edges 573 of the filter 540 are hermetically sealed at the faces 567, 569 so that the target mixture 530 flows through the through holes within the filter 540 and not around the edges of the filter 540. The edges 573 can be hermetically sealed between the faces 567, 569 using any suitable sealing system 575, such as, for example, O-rings and/or metal gaskets.

Referring also to FIGS. 6A and 6B, the filter 540 is formed of a bulk sheet-like substance in a solid phase that has a first flat surface 677 that faces the second chamber (or reservoir 505) and a second flat surface 679 that faces the orifice 555 of the nozzle 550. The material of the bulk substance is selected to be compatible with the target mixture to be filtered and the bulk substance can be a metal, metal alloy, or a non-metal.

The filter 540 includes a plurality of through holes 680 formed into the bulk substance and extending from the second flat surface 679. The holes 680 are fluidly coupled at a first end 681 to the second chamber (or reservoir) 505 that holds the target mixture 530, and are fluidly coupled at a second end 683 (which is at the second flat surface 679) to the orifice 555 of the nozzle 550. In some implementations, all of the holes 680 are through holes such that the target mixture is able to pass entirely through every one of the holes 680 of the filter 540.

At least a set of the through holes 680 of the filter 540 are uniformly sized in that their cross-sectional widths 685 do not vary by more than a maximum acceptable value from each other. Thus, for example, the cross-sectional width 685 of each through hole 680 of a set can vary no more than 20% from the cross-sectional width 685 of each of the other through holes 680 of the set. In this exemplary way, the filter 540 is formed with a design that is distinct from that of a sintered filter, which does not have uniformly-sized holes.

The number of through holes 680 and the cross-sectional width 685 of the through holes 680 in the filter 540 can be chosen based on the particular target material to be passed through the filter 540, the non-target particles to be blocked by the filter 540, or the necessary pressure drop maintained across the filter 540. For example, the number of through holes 680 and the cross-sectional width 685 of each of the through holes 680 can be selected so that the pressure drop across the filter 540 is negligible after the target mixture 530 fills a volume 547 between the filter 540 and the nozzle 550 and the target mixture 530 flows through the nozzle orifice 555. The cross-sectional widths 685 of the through holes 680 can be selected based on the size of the non-target particles to be blocked so that the widths 685 are smaller than the size of the non-target particles to be blocked. For example, the cross-sectional widths 685 can be less than about 10 μm.

Additionally, the holes 680 can form "channels" in that each through hole 680 has a defined height 687 that extends from the second flat surface 679 a long enough distance to form a channel. For example, in some implementations, the height 687 of a particular channel hole 680 can be configured to be greater than or equal to the cross-sectional width 685 of that through hole 680. In this way, the filter 540 is formed with a design that is distinct from that of a mesh because the filter 540 has at least one flat surface 677, 679 and because each of the holes 680 of the filter 540 are formed as channels; with each channel having a defined height 687 that is at least 75% of the cross-sectional width 685 of the channel, at least 100% of the cross-sectional width 685 of the channel, or greater than 100% of the cross-sectional width 685 of the channel. For example, if the cross-sectional width 685 is 1 μm, then the height 687 can be greater than 1 μm and in one specific implementation the height 687 can be 10 μm.

The filter 540, in this implementation, also includes a plurality of openings 690, each opening 690 extending between the first flat surface 677 that faces the reservoir 505 and a group 691 of through holes 680 such that the opening 690 fluidly couples the reservoir 505 to the group 691 of through holes 680. Each opening has a cross-sectional width 693, and each through hole 680 in the group 691 has a cross-sectional width 685 that is less than the cross-sectional width 693 of the opening 690 to which that through hole 680 is fluidly coupled.

The through holes 680 can be cylindrically-shaped, that is, they can have a cross-sectional shape that is cylindrical or approximately cylindrical. The through holes 680 can have a uniform cross-sectional width 685 along an axis 689 (which is perpendicular to the longitudinal direction 241) of the through hole 680.

The through holes 680 can be formed using any suitable method. In FIGS. 7-14B, an exemplary method is shown in which the through holes are etched into a bulk substance 743, and the steps are detailed below.

Referring to FIG. 7, the method starts with the bulk substance 743, which has a first flat surface 777 and a second opposing temporary flat surface 769. The bulk substance 743 can be formed using any standard machining or fabrication process. The bulk substance 743 can be made of any suitable material that does not react adversely to the target material. Thus, if the target material is tin, then the bulk substance 743 could be tungsten. Moreover, in one implementation, the width 753 of the bulk substance 743 can be between about 2 mm to about 10 mm and the height 757 of the bulk substance 743 can be between about 10% to about 50% of the width 753, which would be between about 0.2 mm to about 5 mm for the exemplary height 757 noted above. The width 753 and the height 757 of the bulk substance 743 are selected based on the application of the filter to be formed, the configuration of the nozzle, the reservoir, the ultimate size of the holes to be formed in the filter, and the pressure differential across the filter.

Figure 8A:
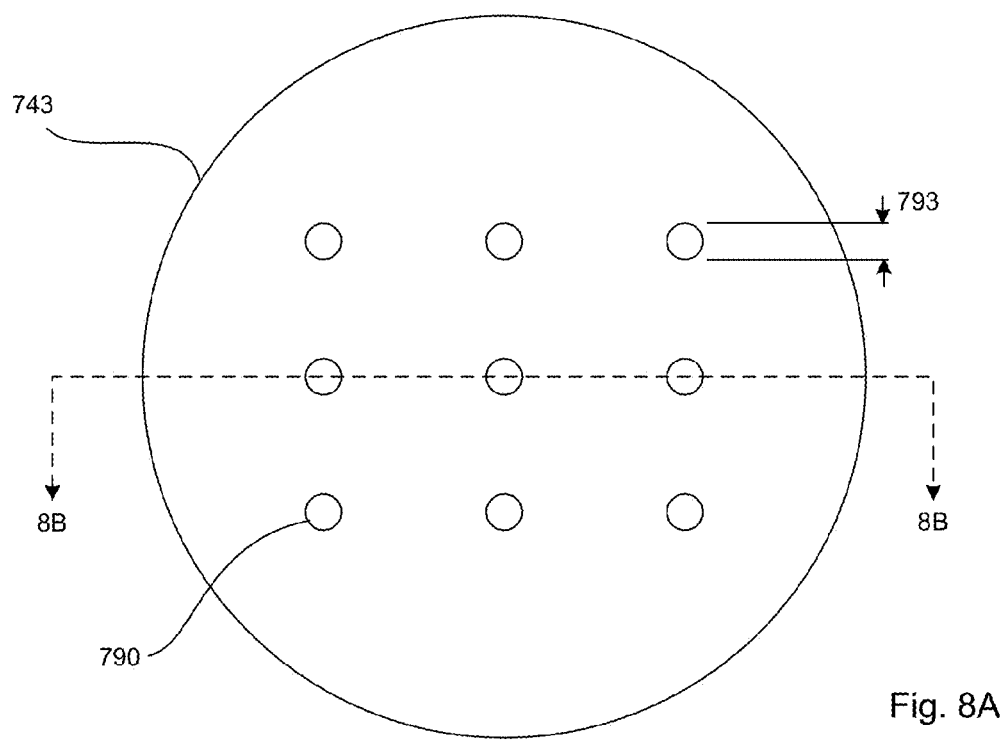
FIG. 8A is a top view of the bulk substance of FIG. 7 showing openings formed therein.
Figure 8B:
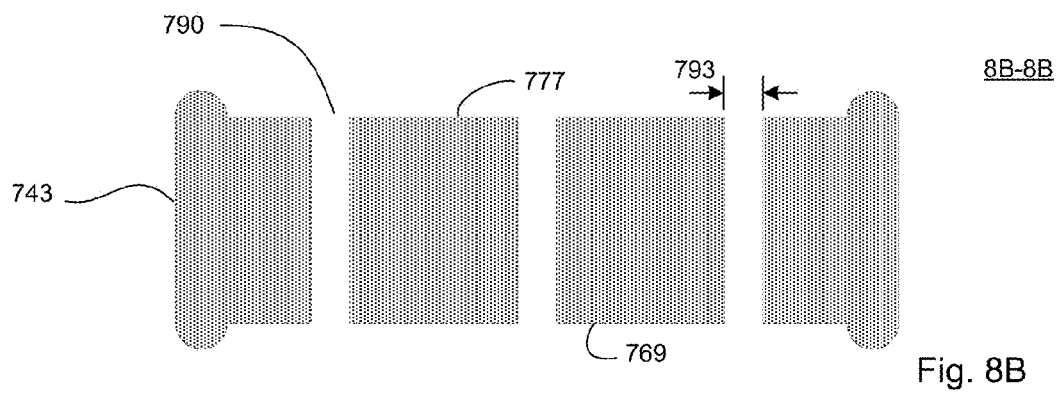
FIG. 8B is a cross-sectional view taken along 8B-8B of the bulk substance of FIG. 8A.

Referring to FIGS. 8A and 8B, a plurality of openings 790 are formed in the bulk substance 743, the openings 790 extending from the first surface 777 to the temporary second surface 769. The openings can be formed as an array (a regular pattern as shown in FIG. 8A) of openings or they can be randomly placed throughout the substance 743. In some implementations, the openings 790 are formed using standard machining processes such as milling or drilling. In other implementations in which the substance 743 is a substance that is too hard to machine using traditional techniques and is electrically conductive, then the openings 790 can be formed using electrical discharge machining (EDM). In other implementations, the openings 790 are formed using lithography or etching techniques.

The number of openings 790 that are formed and the width 793 of each opening 790 are determined at least in part by the pressure limits of the bulk substance 743 and by the desired number of holes that are needed for filtering. In an implementation in which the bulk substance 743 is tungsten, the width 793 of an opening 790 can range between about 20 μm to about 500 μm.

Figure 9:
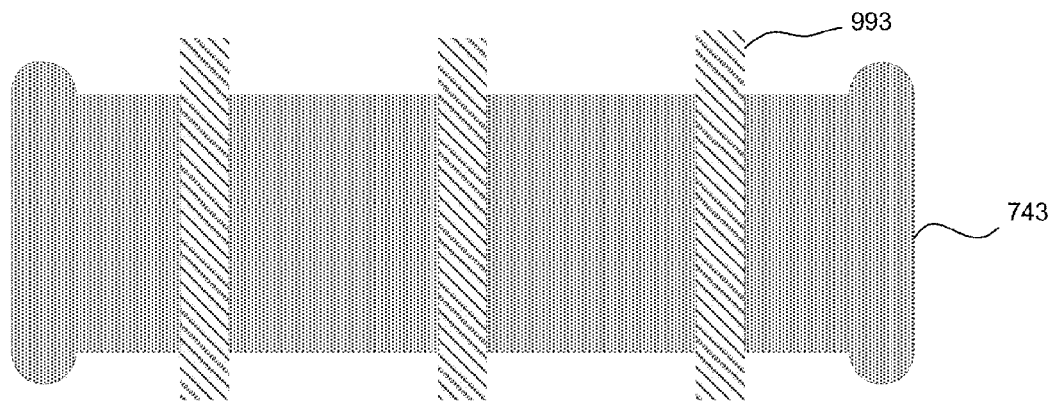
Figure 10:
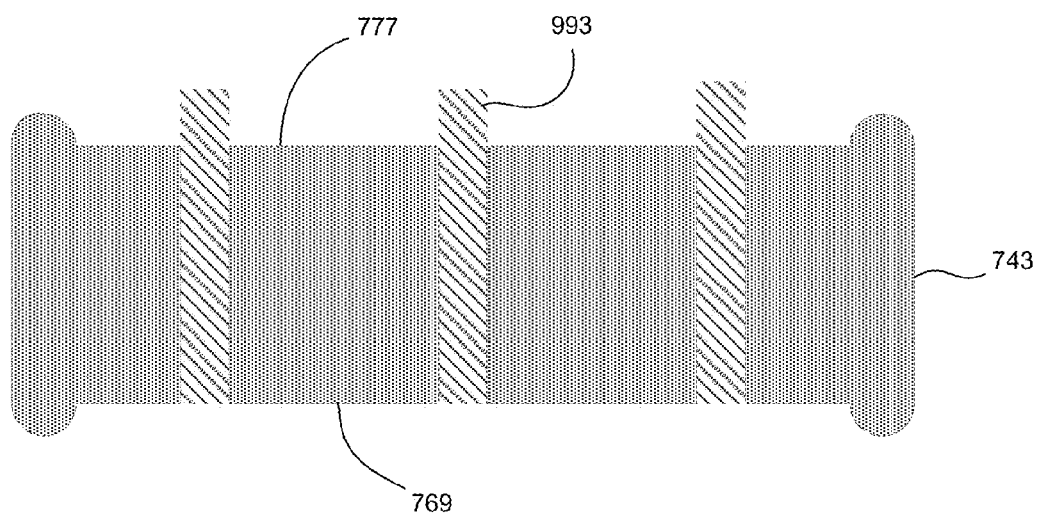
Figure 11:
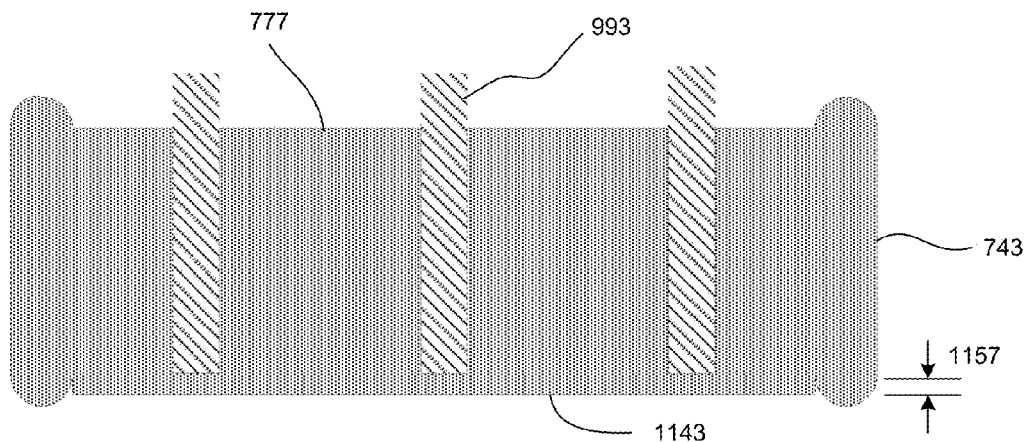

Referring next to FIG. 9, the openings 790 are each filled with a filler substance 993 that exhibits adequate differential etching relative to the bulk substance 743. The filler substance 993 can be any etchable polymer or other substance as used in lithographic applications if the bulk substance 743 is tungsten. Referring to FIG. 10, the filler substance 993 is polished to be flush with the second temporary surface 769. Next, as shown in FIG. 11, a layer 1143 of the material that makes up the bulk substance 743 is deposited on the second temporary surface 769. Thus, as an example, the layer 1143 is made of tungsten if the bulk substance 743 is made of tungsten. In the example in which the bulk substance 743 has a height 757 of about 1 mm and a width 753 of about 5 mm, the thickness 1157 of the layer 1143 can be between about 5 μm and about 15 μm.

Figure 12:
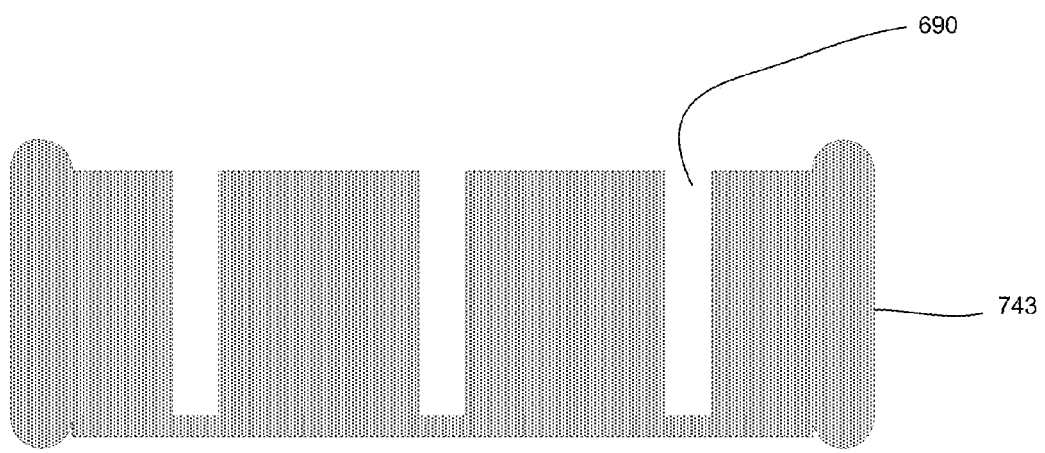

Next, as shown in FIG. 12, the filler substance 993 is removed by, for example, etching to form the openings 690. Then, as shown in FIGS. 13A and 13B, a photoresist 1395 is applied to the layer 1143 and the photoresist 1395 is patterned with holes 1397. Referring to FIGS. 14A and 14B, the bulk substance 743 is etched to transfer the photoresist patterned holes 1397 into the bulk substance 743 to form the through holes 680. After the through holes 680 are formed, then the photoresist 1395 is removed to form the completed filter, as shown in FIGS. 6A and 6B.

Referring to FIG. 15, in another implementation, a filter 1540 can be formed as a capillary array. The filter 1540 is arranged near an opening 1565 of the second chamber 505 and is mounted between an outer face 1567 of the second chamber 505 and a face 1569 of a holder 1571 that houses the supply system 545. The mount is configured such that the edges 1573 of the filter 1540 are hermetically sealed at the faces 1567, 1569 so that the target mixture 530 flows through the through holes within the filter 1540 and not around the edges of the filter 1540. The edges 1573 can be hermetically sealed between the faces 1567, 1569 using any suitable sealing system 1575, such as, for example, O-rings and/or gaskets.

Referring also to FIGS. 16 and 17, the filter 1540 is formed of a bulk substance 1643 in a solid phase that has a first flat surface 1677 that faces the second chamber (or reservoir 505) and a second flat surface 1679 that faces the orifice 555 of the nozzle 550. The material of the bulk substance 1643 is selected to be able to withstand high pressure differentials. In some implementations, the bulk substance 1643 is made of titanium. The bulk substance 1643 is formed with a tapered passage 1669 that has a geometry that accommodates a collimated hole structure 1680, which is made of any material that is compatible with the target mixture 530 to be filtered. In some implementations, the structure 1680 is made of a non-metal such as glass.

The collimated hole structure 1680 includes a cladding 1693 and an inner region 1697 that fits within the tapered passage 1669, and the through holes are formed in the inner region 1697. The through holes in the region 1697 can have a cross-sectional width that is comparable to the cross-sectional width 685 of each through hole 680 of the filter 540. For example, the cross-sectional width of each through hole in the inner region 1697 can be between about 0.5 μm to about 2.0 μm for a target material such as tin. Additionally, the height of each through hole in the inner region 1697 can be between about 1-10 mm. The region 1697 can include at least 10,000 through holes.

The through holes formed into the region 1697 extend between the second flat surface 1679 and the first flat surface 1677, and they are fluidly coupled at a first end 1681 to the second chamber (or reservoir) 505 that holds the target mixture 530, and are fluidly coupled at a second end 1683 to the orifice 555 of the nozzle 550.

At least a set of the through holes of the filter 1540 can be uniformly sized in that their cross-sectional widths do not vary by more than a maximum acceptable value from each other. Thus, for example, the cross-sectional width of each through hole of the set can vary no more than 20% from the cross-sectional width of each of the other through holes of the set. In this way, the filter 1540 is formed with a design that is distinct from that of a sintered filter, which does not have a set of uniformly-sized holes.

Additionally, the number of through holes and the cross-sectional width of each of the through holes in the filter 1540 can be chosen based on the particular target material to be passed through the filter 1540, the non-target particles to be blocked by the filter 1540, or the necessary pressure drop maintained across the filter 1540. For example, the number of through holes and the cross-sectional width of the through holes can be selected so that the pressure drop across the filter 1540 is negligible after the target mixture 530 fills a volume 1547 between the filter 1540 and the nozzle 550 and the target mixture 530 flows through the nozzle orifice 555. The cross-sectional widths of the through holes can be selected based on the size of the non-target particles to be blocked so that the widths are smaller than the size of the non-target particles to be blocked.

Additionally, as discussed above with respect to the filter 540, the through holes of the filter 1540 can form "channels" in that each channel hole has a defined height that extends from the second end 1683 a long enough distance to form a channel. For example, the height of a particular channel hole can be configured to be greater than or equal to the cross-sectional width of that channel hole. In this way, the filter 1540 is formed with a design that is distinct from that of a mesh because the filter 1540 has at least one flat surface 1677, 1679 and because each of the holes of the filter 1540 are formed as channels; with each channel having a defined height that is at least 75% of the cross-sectional width of the channel, at least 100% of the cross-sectional width of the channel, or greater than 100% of the cross-sectional width of the channel.

The through holes of the filter 1540 can be cylindrically-shaped, that is, they can have a cross-sectional shape that is cylindrical or approximately cylindrical. Moreover, the through holes can have a uniform cross-sectional width along an axis 1689 of the through hole.

The through holes in the region 1697 of the filter 1540 are formed using a glass drawing process, an etching process, or using drawn tube structures, as detailed by Collimated Holes, Inc. of Campbell, Calif. (http://www.collimatedholes.com/products.html).

Referring also to FIGS. 18A and 18B, a filter 1840 is shown next to a sintered filter 1898 having an equivalent transverse extent TE to that of the filter 184. The filter 1840 is a generalized representation of the filters described above, and it is not drawn to scale in FIG. 18A, but is shown merely to provide context for the following description. The transverse extent TE is a size of the filter 1840 or the sintered filter 1898 that extends along a direction that is transverse to the longitudinal direction 241 defined by the flow of the target mixture through the filter 1840. The filter 1840 has a surface 1877 that extends along a plane that is transverse to the longitudinal direction 241 and the sintered filter 1898 has a surface 1899 that extends along a plane that is transverse to the longitudinal direction 241. The surface 1877 is the surface near the through holes that remove at least some of the non-target particles of the target mixture that impinges upon the filter 1840; thus, the target mixture contacts the surface 1877.

When used in the target material supply apparatus, the filter 1840 has a surface area that is exposed to the target mixture and this is referred to as the exposed surface area of the filter 1840; and the sintered filter 1898 has a surface area that is exposed to the target mixture and this is referred to as the exposed surface area of the filter 1898. In the situation in which the filter 1840 and the sintered filter 1898 have the same transverse extent, the exposed surface area of the filter 1840 is significantly less than an exposed surface area of the sintered filter 1898. Thus, for example, if the filter 1840 and the sintered filter 1898 have the same transverse extent, the exposed surface area of the filter 1840 is less than one hundredth of the exposed surface area of the sintered filter 1898; the exposed surface area of the filter 1840 is less than one ten thousandth of the exposed surface area of the sintered filter 1898; or the exposed surface area of the filter 1840 is less than one millionth of the exposed surface area of the sintered filter 1898.

Because of this significant reduction in exposed surface area, the filter 1840 is less likely to clog and more easily transfers the target material through while blocking the non-target particles than the sintered filter 1898 of the same transverse extent.

Other implementations are within the scope of the following claims.

For example, the target material supply apparatus 127 can have only one chamber or more than two chambers. The filters can be placed after any of the chambers of the apparatus 127, depending on the situation, as long as the filter with the uniformly-sized through holes and/or the lower surface area is placed between a reservoir of the target mixture and the nozzle.

For example, the filter 240, 340, 440 can be formed by micromachining an array of channel holes to create a sieve, by assembling a bundle of fibers of material (such as ceramic) compatible with the target material, by placing a filter media (such as quartz) in a larger section of quartz that is fused to a nozzle, or with a quartz tube having an in-situ frit filter (for example, chromatography capillary).

What is claimed is:

1. An apparatus for supplying a target material to a target location, the apparatus comprising:
   a reservoir comprising a reservoir opening and an outer face, the reservoir configured to receive a target mixture that includes the target material and non-target particles, the target material comprising a metal that, when converted to plasma, has an emission line in the extreme ultraviolet (EUV) range;
   a first filter through which the target mixture is passed, the first filter comprising a surface area that is exposed to the target mixture;
   a second filter through which the target mixture is passed, the second filter comprising a first surface and a second opposing surface;
   a supply system comprising a nozzle, the nozzle comprising an orifice that is fluidly coupled to the second surface of the second filter, the supply system configured to receive a filtered target mixture that includes target material that has passed through the first and second filters and configured to supply the filtered target mixture to the target location by passing the filtered target mixture through the orifice; and a holder that houses the supply system, the holder comprising a face, wherein the second filter is hermetically sealed to the outer face of the reservoir and hermetically sealed to the face of the holder, the second filter includes a set of through holes between the first surface and the second surface, the through holes having a longitudinal axis, at least a portion of the through holes having a uniform cross-sectional width along the longitudinal axis, and the second filter has a surface area that is exposed to the filtered target mixture, the surface area of the second filter that is exposed to the filtered target mixture being less than the surface area of the first filter that is exposed to the target mixture.

2. The apparatus of claim 1, wherein the second filter receives the target mixture that has passed through the first filter.

3. The apparatus of claim 1, wherein the through holes of the set of through holes have uniformly-sized cross-sectional widths.

4. The apparatus of claim 3, wherein the second filter includes a second set of uniformly-sized through holes that extend from the first surface to the second surface, at least some of the through holes in the second set of through holes having a transverse size that is different from a transverse size of the uniformly-sized through holes of the set of through holes.

5. The apparatus of claim 1, wherein the first filter includes a set of through holes.

6. The apparatus of claim 5, wherein the cross-sectional widths of the through holes of the first filter set are different from the cross-sectional widths of the through holes of a second filter set.

7. The apparatus of claim 1, wherein the second filter has a thickness along the longitudinal axis that is large enough to withstand a pressure differential across the second filter.

8. The apparatus of claim 1, wherein each hole in the set of through holes of the second filter has a cross-sectional width that is less than 10 μm.

9. The apparatus of claim 1, wherein:
the cross-sectional width of each hole in the set of through holes of the second filter is less than a cross-sectional width of the orifice of the nozzle of the supply system.

10. The apparatus of claim 1, wherein at least one of the first and second filters is made at least in part of tungsten, titanium, molybdenum, nickel, tantalum, or other metal, quartz, glass, or ceramic material.

11. The apparatus of claim 1, wherein the through holes of the set in the second filter are sized to block at least some of the non-target particles.

12. The apparatus of claim 1, wherein the target material is in a fluid state.

13. The apparatus of claim 1, wherein the second filter is a non-sintered and non-mesh filter.

14. The apparatus of claim 1, wherein:
the first filter is made of a first material; and
the second filter is made of a second material that is different from the first material;

the apparatus further comprising a radiation source that supplies radiation to the target location to thereby strike the target mixture.

15. An apparatus comprising: a reservoir comprising a reservoir opening, the reservoir configured to receive a target mixture that includes the target material and non-target particles, the target material comprising a metal that, when converted to plasma, has an emission line in the extreme ultraviolet (EUV) range; a first filter through which the target mixture is passed, the first filter comprising a surface area that is exposed to the target mixture; a second filter through which the target mixture is passed, the second filter comprising a first surface and a second opposing surface; and a supply system comprising an orifice that is fluidly coupled to the second surface of the second filter, the supply system configured to receive a filtered target mixture that includes a target material that has passed through the first and second filters and configured to supply the filtered target mixture to the target location by passing the filtered target mixture through the orifice, wherein the second filter is hermetically sealed to an outer face of the reservoir and to a face of a holder that houses the supply system, the second filter has a surface area that is exposed to the filtered target mixture, the surface area of the second filter that is exposed to the filtered target mixture being less than the surface area of the first filter that is exposed to the target mixture, the second filter comprises a plurality of groups of through holes, the through holes extending from the second surface toward the first surface along a longitudinal axis, at least a portion of the through holes having a uniform cross-sectional width along the longitudinal axis, a first end of the through holes in the second filter face a first end of the reservoir, and are fluidly coupled at a second end to the orifice; the second filter comprises a plurality of openings, each opening being between the reservoir opening and a particular group of through holes such that the opening fluidly couples the reservoir opening to the particular group of through holes, and each through hole in the particular group of through holes has a cross-sectional width that is smaller than the cross-sectional width of the opening to which the particular group of through holes is fluidly coupled, the through holes sized to remove at least some of the non-target particles from the target mixture.

16. The apparatus of claim 15, wherein each of the through holes in any of the groups of through holes has a uniform cross-sectional width along the longitudinal axis.

17. The apparatus of claim 15, wherein the through holes are a capillary array.

18. The apparatus of claim 15, wherein each opening is between a first surface of the second filter that is hermetically sealed to the reservoir and a particular group of through holes.

19. The apparatus of claim 15, wherein the plurality of through holes are defined between a second surface that faces a nozzle and the plurality of openings.

20. The apparatus of claim 1, wherein:
the second filter comprises a sheet, and the first surface comprises a flat surface and the second surface comprises a flat surface; and
the through holes of the set of through holes in the second filter extend from the second flat surface and are fluidly coupled at the second flat surface to the orifice.

21. The apparatus of claim 1, wherein a cross-sectional width of each through hole of the set of through holes varies no more than 20% from the cross-sectional width of each of the other through holes of the set of through holes and the cross-sectional width of each hole of the set of through holes is less than a height of the hole.

22. The apparatus of claim 21, wherein a number and the cross-sectional width of the holes of the set of through holes are chosen so that a pressure drop across the second filter is negligible after the target mixture fills a volume between the second filter and the nozzle and the target mixture flows through the orifice.

23. A method of filtering, the method comprising: receiving a target mixture that includes a target material and non-target particles in a reservoir, the target material comprising a metal that, when converted to plasma, has an emission line in the extreme ultraviolet (EUV) range; removing, using a first filter, at least some of the non-target particles of the target mixture; removing, using a second filter that is hermetically sealed to an outer face of the reservoir and to a face of a holder that houses a supply system, at least some of the non-target particles of the target mixture by exposing a surface area of the second filter to the target mixture, the second filter comprising a first surface and second opposing surface, and a set of through holes that extend from the second surface toward the first surface along a longitudinal axis, at least a portion of the through holes having a uniform cross-sectional width along the longitudinal axis and comprising a surface area exposed to the target mixture that is less than a surface area of the first filter that is exposed to the target mixture; controlling, using the supply system, a flow of the target mixture that passed through the second filter by passing the target mixture through an orifice that is defined by the supply system and fluidly coupled to the second filter; directing a stream of the target mixture released from the orifice to a target location that receives an amplified light beam sufficient to convert the target mixture to plasma that emits extreme ultraviolet (EUV) light, the stream of filtered mixture comprises a stream of the filtered target mixture; and collecting the EUV light.

24. The method of claim 23, wherein removing at least some of the non-target particles of the target mixture using the second filter comprises removing at least some of the non-target particles of the target mixture that remain after having passed through the first filter.

25. The method of claim 23, further comprising removing, using the second filter, at least some non-target particles of the target mixture that were introduced into the target mixture by the first filter.

26. The apparatus of claim 1, further comprising:
a vacuum chamber that contains the target location, the vacuum chamber defined by a wall that holds a portion of the supply system with the orifice facing an interior of the vacuum chamber; and
a collection mirror in the vacuum chamber, the collection mirror positioned to have a focus at the target location.

27. The apparatus of claim 26, wherein the target material is molten tin.

28. The apparatus of claim 27, wherein the second filter is made at least in part of tungsten or glass.

29. The apparatus of claim 1, wherein the second filter is made of a material that is non-reactive with the target mixture.

30. The apparatus of claim 28, wherein the first filter is made from a material other than tungsten or glass.

31. The apparatus of claim 6, wherein the cross-sectional widths of the through holes of the first filter set are larger than the cross-sectional widths of the through holes of the second filter set.

32. The apparatus of claim 27, wherein the second filter receives the target mixture that has passed through the first filter, and the exposed surface area of the second filter blocks particles having a diameter greater than a diameter of the orifice.

33. The apparatus of claim 1, wherein the first filter comprises a sintered filter having an equivalent transverse extent to that of the second filter.

34. The apparatus of claim 1, wherein the second filter comprises a solid-phase bulk material.

35. The apparatus of claim 1, wherein the first filter is in the reservoir.

36. The apparatus of claim 1, wherein the second filter is fluidly coupled to the reservoir opening.

37. The apparatus of claim 1, further comprising:
a chamber configured to receive a bulk material that, when heated, forms the target mixture; and
a pipe that fluidly couples the chamber to the reservoir, wherein
the first filter is in the pipe, and the reservoir receives the target mixture from the pipe.

38. The apparatus of claim 1, wherein the through holes extend from the first surface to the second surface along the longitudinal axis.

39. The apparatus of claim 15, wherein the first filter and the second filter are in the reservoir.

40. The apparatus of claim 15, further comprising:
a chamber configured to receive a bulk material that, when heated, forms the target mixture; and
a pipe that fluidly couples the chamber to the reservoir, wherein the first filter is in the pipe, and the reservoir receives the target mixture from the pipe.

41. The apparatus of claim 40, wherein the first filter is between the chamber and the supply system.

42. The apparatus of claim 41, wherein the first filter is in the pipe.

* * * * *